Nov. 28, 1950     C. A. DAHLQUIST ET AL     2,532,011
LINERS AND ADHESIVE TAPES HAVING LOW ADHESION
POLYVINYL CARBAMATE COATINGS
Filed Sept. 7, 1946

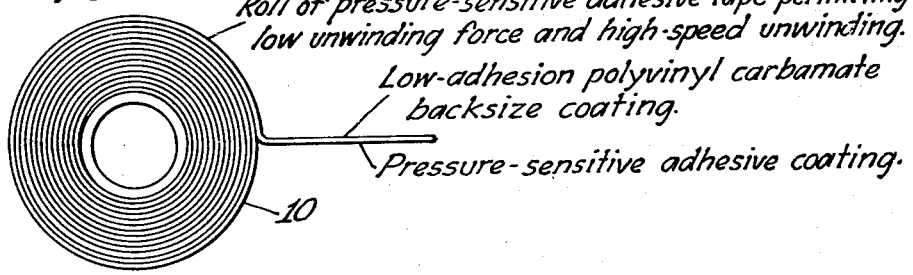

Fig. 1
Roll of pressure-sensitive adhesive tape permitting low unwinding force and high-speed unwinding.
Low-adhesion polyvinyl carbamate backsize coating.
Pressure-sensitive adhesive coating.

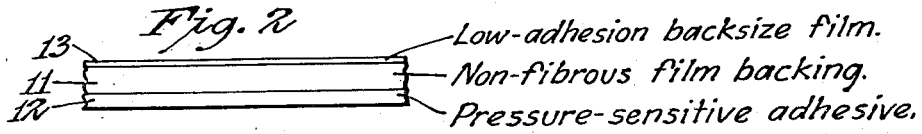

Fig. 2
Low-adhesion backsize film.
Non-fibrous film backing.
Pressure-sensitive adhesive.

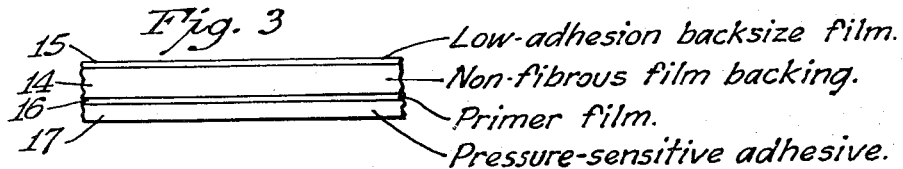

Fig. 3
Low-adhesion backsize film.
Non-fibrous film backing.
Primer film.
Pressure-sensitive adhesive.

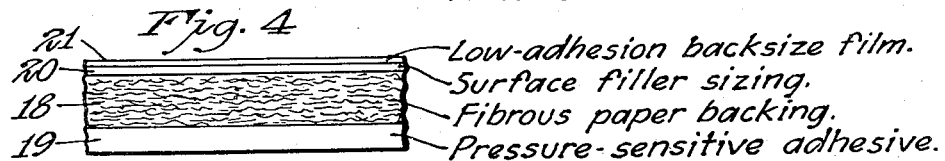

Fig. 4
Low-adhesion backsize film.
Surface filler sizing.
Fibrous paper backing.
Pressure-sensitive adhesive.

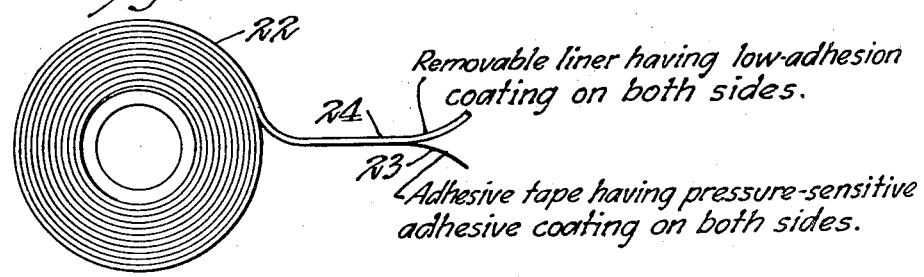

Fig. 5
Removable liner having low-adhesion coating on both sides.
Adhesive tape having pressure-sensitive adhesive coating on both sides.

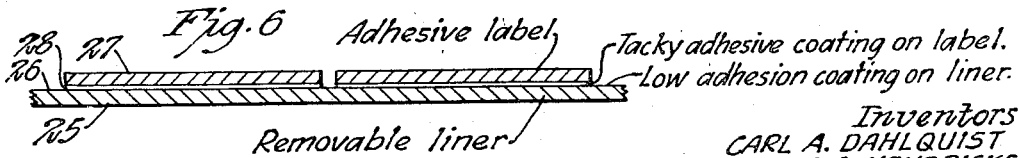

Fig. 6
Adhesive label.
Tacky adhesive coating on label.
Low adhesion coating on liner.
Removable liner.

Inventors
CARL A. DAHLQUIST
JAMES O. HENDRICKS
WILLIAM E. SOHL
By Carpenter, Abbott, Coulter & Kinney
Attorneys Patented Nov. 28, 1950

2,532,011

UNITED STATES PATENT OFFICE 2,532,011

LINERS AND ADHESIVE TAPES HAVING LOW ADHESION POLYVINYL CARBAMATE COATINGS

Carl A. Dahlquist, St. Paul, James O. Hendricks, White Bear Lake, and William E. Sohl, Birchwood, Minn., assignors to Minnesota Mining & Manufacturing Company, St. Paul, Minn., a corporation of Delaware Application September 7, 1946, Serial No. 695,522

10 Claims. (Cl. 154—53.5)

This invention relates to the problem of providing surface coatings which are adapted to contact tacky adhesive surfaces with a low degree of adherency thereto, so that subsequent separation can be effected with an unusually low removal effort. Such coatings have value, for example, as back-size coatings on pressure-sensitive adhesive tapes wound in rolls, to permit of easier unwinding, and in making liners adapted for easy separation from adherent rubber surfaces. These coatings, which have a high degree of inactivity (a low affinity) towards contacting adhesives, are referred to as low-adhesion coatings. The force required to strip an aggressively tacky pressure-sensitive adhesive tape from a good low-adhesion coating should not exceed half the force required to strip it from cellophane.

An object of the invention is to provide good low-adhesion coatings which nevertheless are also adapted to firmly bond to a wide variety of base surfaces upon which they may be applied. The low-adhesion coatings of this invention are adapted to removably contact a wide variety of tacky adhesive surfaces, even for long periods, without spoiling the adhesion of the latter to other surfaces. An object is to provide improved articles having such low-adhesion coatings, including adhesive tapes and liners.

This invention is based upon our discovery of the remarkable effectiveness as low-adhesion coatings of the polyvinyl carbamate polymers wherein the carbamate side chains terminate with an alkyl group more than five carbon atoms in length, and preferably at least 14. These can be made by reacting together polyvinyl alcohol and an appropriate isocyanate having a terminal alkyl group. An example is polyvinyl N-octadecyl carbamate, made by reacting together polyvinyl alcohol and octadecyl isocyanate; which has 18 carbon atoms in the nitrogen-bonded side chain alkyl groups. The term "isocyanate" as used herein refers to monofunctional compounds containing a single —N=C=O group, and does not include the di-isocyanates.

These polyvinyl carbamates are thermoplastic, water-insoluble and water-repellent (hydrophobic). They are soluble in volatile aromatic solvents (such as toluene and xylene), and may be readily applied in solution form by simple coating procedures followed by drying to form solvent-free continuous films. Coatings on cellulosic films are tenaciously bonded. The coating may be extremely thin. For example, one pound of polyvinyl N-octadecyl carbamate suffices for coating 5,000 square yards of cellophane (regenerated cellulose film) on one side. Hence the cost of use is quite low.

Before giving a more detailed discussion of the chemistry of the present low-adhesion coating compositions, various illustrative products embodying the invention will be described in connection with the accompanying drawing. The products are shown in diagrammatic side or edge views in the various figures.

Fig. 1 shows a roll 10 of pressure-sensitive adhesive tape wound directly upon itself. The tape has a normally tacky and pressure-sensitive adhesive coating on the face side, and a low-adhesion polyvinyl carbamate backsize coating on the back side. The tape is wound so that the adhesive side is on the inside. In the roll, the backing serves not only as a permanent base or support for the tacky adhesive coating but also as a temporary liner since, in the latter connection, the backing in each turn of the roll temporarily contacts and covers the adhesive surface of the overlying turn. The limited adhesion between the backsize and the pressure-sensitive adhesive makes it possible to unwind the tape with less effort. Moreover, when the tape is unwound, there is less pull of the adhesive upon the back surface of the underlying convolution from which it is separated, thereby reducing the force tending to cause delamination of the tape structure and its constituent elements, and tending to cause breaking and tearing of the tape. The degree of adherency is sufficient to hold the wound tape in place and thus prevent spontaneous separation of the turns in the roll, without the need of any holding device (such as is needed in the case of rolls of non-tacky tape).

An important feature of the present low-adhesion backsize is that it has a "yield point," which means that as the rate of unwinding a tape roll is increased, a point is reached where the required force does not increase with further increase of rate, and beyond this point the force is actually less until a very high rate is reached. This feature is of importance in permitting high-speed unwinding in mechanical devices (such as motor-driven tape dispensers and machines for rewinding tape upon different cores), as well as an easier unwinding at hand speeds. Not only is less power needed for rapid unwinding, but the tension on the tape is kept low enough to minimize the chances of the tape breaking. This in turn permits of using weaker backings than would otherwise be needed.

Fig. 2 shows a magnified edge view of an illustrative tape having a non-fibrous film backing 11 coated on the face side with a normally tacky and pressure-sensitive adhesive 12 and on the back side with a low-adhesion polyvinyl carbamate backsize film 13. The backsize results in the backing having a back surface which has a lower specific adhesion toward the pressure-sensitive adhesive layer than does the inner surface on which the adhesive layer is coated, and the resultant differential between the two surfaces aids in reducing or preventing offsetting of the adhesive when the tape is unwound from a roll. Even though the back surface of the non-fibrous film 11, which would be the back surface of the tape if the low-adhesion backsize 13 were not present, would be inactive to the adhesive to a degree permitting unwinding of the tape from a roll without offsetting or transfer of adhesive, still the backsize has value in providing an extra margin of safety at a trivial increase in cost for insuring against delamination and offsetting of the adhesive under severe or unusual conditions of use. Thus the low-adhesion backsize provides a "negative" outside primer which is equivalent to the "positive" inside primer commonly used in such tapes (i. e. a primer coating upon the front face of the backing film, upon which the adhesive is in turn coated and which has a stronger adherency to the adhesive layer than does the surface of the backing film). In addition, there are the further benefits previously discussed in connection with Fig. 1, such as easier unwinding of the tape from rolls.

The invention embodied in the Fig. 2 type of tape is not limited to particular non-fibrous film backings nor to particular pressure-sensitive adhesive compositions. The polyvinyl carbamate backsize can be applied by coating from solution upon a wide variety of non-fibrous films to which the ultimate dried backsize film will be firmly bonded so as to prevent delamination under the pull of the contacting adhesive when the tape is unwound from rolls. The two tape backing films in most common commercial use are normal cellophane (non-moistureproofed regenerated cellulose films softened with glycerine) and plasticized cellulose acetate films, and extensive experiments have demonstrated the usefulness of the present polyvinyl carbamate backsize for each of them. Other cellulosic films are illustrated by those made of ethyl cellulose, benzyl cellulose, cellulose butyrate, cellulose aceto-butyrate, cellulose nitrate, etc. A suitable glassine paper can be used. Examples of non-cellulosic films are the various vinyl polymer films such as those made from polyvinyl acetate, copolymers of vinyl acetate and vinyl chloride, polyvinyl butyral, polyvinylidene chloride, etc. Various other backing films are known to those skilled in the art.

The pressure-sensitive adhesive may be one of the numerous water-insoluble rubbery base or rubber-resin type adhesives, wherein a natural or synthetic rubber base provides cohesion (internal strength) and elasticity (a retractive force when stretched and retraction when released after stretching); and is modified in a way which increases adhesion (tackiness) and decreases cohesion, with an attendant modification of stretchiness (elongation under low stresses) and elasticity; thereby resulting in an adhesive having a proper four-fold balance of adhesion, cohesion, stretchiness and elasticity. It is this four-fold balance which permits the tape to be aggressively and stably tacky and yet capable of being stripped back from smooth non-fibrous surfaces to which temporarily applied (such as those of plate glass, metal sheets and packaging films) without delamination or offsetting of adhesive, even though the adhesive is coated upon a glassy-surfaced non-porous film backing having approximately the same adhesion value toward it. The modification of the rubbery base of the adhesive is commonly effected by blending a compatible tackifier resin (such as ester gum) in proportion to secure the desired combination of tacky and non-offsetting properties. It is possible to use certain synthetic polymer compositions which are inherently normally tacky and pressure-sensitive and possess the above-mentioned four-fold balance of properties, and hence these are classed in the art as being of the rubber-resin type.

These adhesives are termed "eucohesive" by which it is meant that they are more cohesive than adhesive such that offsetting or transfer of adhesive material does not result when a sheet or tape coated therewith is unwound from rolls or removed from surfaces to which temporarily applied, and can be handled without transfer of adhesive material to the fingers. Examples of pressure-sensitive tape adhesive compositions will not be given in detail as numerous ones are known to those skilled in the art (cf. U. S. Patents Nos. 2,156,380—2,177,627—2,319,959). The present polyvinyl carbamate low-adhesion backsize coatings have a general effectiveness.

As previously mentioned, the low adhesion backsize film can be extremely thin. It can be applied to the backing film as a dilute solution in a volatile solvent (such as toluene or xylene), using a squeeze-roll coating procedure, followed by drying to remove the solvent. It will generally be most convenient to backsize the backing film before application of the adhesive to the face side. It has been found that one pound of polyvinyl N-octadecyl carbamate suffices for coating 5,000 square yards of cellophane tape backing, being deposited, for example, from 2 to 10% solutions in toluene or xylene followed by air-drying at room temperature. Such a film is less than one-hundred-thousandth of an inch thick and constitutes a "molecular film" (i. e. a film which has a thickness of only a relatively few molecules). The low-adhesion film need merely have a thickness sufficient to space a contacting adhesive surface from the underlying base surface by a distance which will prevent strong intermolecular attraction. The extreme thinness of the low-adhesion backsize film makes for tenacious bonding and resistance to separation from the backing film, and prevents it from cracking, rupturing or flaking when the tape is bent at a sharp angle or creased. Maximum flexibility, transparency and inconspicuousness are also insured. In commercial practice it sometimes may be found more convenient to apply a coating which is considerably thicker than the possible minimum. For example, we have found that a coating weight of 1 lb. of polyvinyl N-octadecyl carbamate per 1000 square yards of cellophane surface gives good results.

A feature of the present backsize is that it is hydrophobic (water-repellent) and provides a waterproof back surface. This is of particular value when the backing film is normal (non-moistureproofed) cellophane, or the like, which is permeable to water and quickly becomes soft and weak when in contact with water. The backsize does not greatly change the moisture-vapor permeability of the cellophane, as it is not moistureproof in respect to water vapor.

The adhesive tape may be of the uncolored transparent type, to provide an "invisible" mending, sealing and holding tape, employed for mending books, records, maps and charts, for sealing transparent pacgkage wrapers and bags, for removably fastening posters and notices on glass windows and bulletin boards and on school blackboards, etc. Or the tape may be a decorative type of tape, transparent or opaque, made by including coloring material (dye or pigment) in the backing film or the adhesive or both, or by printing the backing film, as is well known in the art. Colored tapes are widely used for sealing and decorating gift packages, and as coding tapes for identifying wires, tubes and pipes in complex assemblies. These pressure-sensitive adhesive tapes seal instantly on contact with most surfaces, and do not require moistening or heating.

Fig. 3 shows a magnified edge view of an illustrative tape having a non-fibrous film backing 14 provided with a low-adhesion polyvinyl carbamate backsize film 15. The face side of the backing is coated with a thin primer film 16 upon which is coated a pressure-sensitive adhesive layer 17. The structure is the same as that of Fig. 2 except for the presence of the inside primer film, which serves to bond the adhesive layer to the face side of the backing film more firmly than would be the case if the primer were omitted. Thus a still further increase in adhesion differential results in respect to the adhesion of the pressure-sensitive adhesive to the surface upon which it is coated as compared to its adhesion to the back surface of the tape when wound in a roll. The inside primer also has value in providing an extra margin of safety against adhesive offsetting when the tape is removed from other surfaces to which applied (as when the tape is used to hold a poster on a store window).

The inside primer should be of a kind which is highly cohesive, which strongly anchors to the backing film, and which has greater adhesion to the pressure-sensitive adhesive than would the inner backing film surface. When normal cellophane is used as the backing film, it has been common to employ a two-phase primer film which is the dried deposition product of a coating of an aqueous mixed dispersion of latex rubber (natural or synthetic) and a hydrophilic colloidal agglutinant (such as casein or polyvinyl alcohol)—cf. of U. S. Patents Nos. 2,328,057 and 2,328,066.

Fig. 4 shows a magnified edge view of a pressure sensitive adhesive tape having a fibrous paper backing 18 coated with a pressure-sensitive adhesive 19 upon the face side. The fibrous back side of the paper has a coating of a surface filler sizing 20 which coats the fibers and fills the interstices so as to provide a comparatively smooth and non-absorbent back surface upon which in turn is coated the low-adhesion polyvinyl carbamate backsize film 21. The primary reason for employing the intermediate sizing 20 is to reduce the amount of the polyvinyl carbamate needed for filming the back surface of the tape, and it may be omitted if desired.

The fibrous paper types of backings are customarily unified by pre-impregnation with a material adapted to bind the fibers together so as to prevent splitting or delamination of the paper under the strong force exerted upon the paper when aggressively tacky tape is unwound from rolls thereof (cf. U. S. Patents Nos. Re. 19,128 and 2,236,527). By using a low-adhesion backsize in accordance with this invention, the tape roll unwinding force is reduced so substantially that a less strongly unified paper backing can be employed. In fact the need for impregnation of the paper can be entirely eliminated, as by using a fairly thin and dense type of highly calendered paper. Thus the cost of paper-backed pressure-sensitive tapes, suitable for some purposes, can be greatly reduced. The paper may be flat or creped. Parchmentized paper can be employed.

The filler sizing 20 may be, for example, a coating of glue or casein (which may be insolubilized in situ with formaldehyde), or a cellulose derivative (such as ethyl cellulose or cellulose acetate). It also has value for binding the surface fibers and for waterproofing the paper. The polyvinyl carbamate backsize coating firmly anchors to such sizings.

This principle may also be applied to other fibrous tape backings, such as felted and woven backings made from textile fibers. These may be sized on the back so as to bind the fibers and reduce the amount of the polyvinyl carbamate backsize material which is needed.

Fig. 5 shows a tape roll 22 formed of an adhesive tape 23 which is coated on both sides with a pressure-sensitive adhesive, and is laminated to a removable liner 24 of paper (flat or creped) or cloth which is coated on both sides with a polyvinyl carbamate low-adhesion coating. The liner is thus interwound with the adhesive tape, and the latter is located in the roll between turns of the liner which prevents adjacent turns of the tacky tape from bonding together. The tape and liner are wound in so that the liner is on the outside. When drawn from the roll, the liner can be readily separated due to the low adherency. The low adherency reduces the unwinding effort. The use of inexpensive paper for the liner is feasible because of the reduced tendency to split and break. The liner paper should preferably be given a surface filler sizing before application of the low-adhesion coating, as explained in connection with Fig. 4. An illustrative double-coated pressure-sensitive adhesive tape is described in U. S. Patent No. 2,206,899.

Fig. 6 shows a further illustrative use of low-adhesion liners. The liner sheet 25 (which may be a non-fibrous film, or paper or cloth) is provided with a low-adhesion polyvinyl carbamate surface coating 26. Mounted on this low-adhesion surface of the liner are a plurality of adhesive labels 27, each of which has an integral tacky adhesive coating 28 by which it is detachably adhered to the liner. The labels are thus conveniently held in position with the tacky adhesive surface covered and protected by the liner. When it is desired to remove the label for use, the low-adhesion surface of the liner permits of easy separation, which may be facilitated by curving or flexing the liner. Small labels, such as price labels, can be mounted in large numbers upon a single sheet or strip in this way. Sheets of such labels can be stacked so that a large number of the labels can be stored or carried in a small container without danger of the labels becoming stuck together, and each label is conveniently held in position for removal and use whenever desired. Price labels of this type have the advantage over gummed labels (which require moistening) that they firmly adhere to smooth surfaces and yet can be readily peeled off after a sale has been made, and they require no moistening. Hence they can be used to great advantage on glassware, pottery, silverware, watches, shoes, etc.

Such low-adhesion liners can also be employed to advantage for supporting and protecting tacky bandages and corn plasters, for example.

Milled rubber and latex rubber have adherent surfaces which cause sheets or coatings thereof to cohere when brought together. It is often desired to roll or stack such sheets, or sheet materials having coatings thereof, and where this would result in a sticking or bonding together of the rubber surfaces thus brought into mutual contact, a low-adhesion liner (coated on both sides with low-adhesion coatings) may be employed to advantage as a temporary protective covering, serving to separate the surfaces.

From the foregoing description it will be evident that the term "liner," as broadly used in the claims, includes not only the types of liners just described, but also sheet materials in general which have a low-adhesion surface sizing or coating, including the backings of adhesive tapes (since the latter function in part as liners when the tape is wound in rolls or stacked in sheets). The term "adherent rubber surfaces" is broadly used in reference not only to rubbery base pressure-sensitive adhesives, but also to other rubbery materials which stick or cohere together, even though having little or no adhesion tack towards dissimilar surfaces, as previously described.

A further description will now be given of the chemistry of our low-adhesion polyvinyl carbamate coating compositions, which may be made by reacting together polyvinyl alcohol and an appropriate monofunctional isocyanate. Polyvinyl alcohol is customarily made by hydrolyzing polyvinyl acetate so as to replace acetate groups with hydroxyl groups. The polyvinyl alcohols of commerce retain some acetate groups, as the hydrolysis and replacement is not entirely complete. Reaction with the isocyanate results in replacement of hydroxyl groups by carbamate groups, which form long side chains attached to carbon atoms of the extremely long linear vinyl chain, these side chains providing nitrogen-linked chains terminating with alkyl groups. For present purposes, the polyvinyl alcohol need not be a highly hydrolyzed polyvinyl acetate. For example, we have made low-adhesion polyvinyl carbamate polymers from both 85% and 50% hydrolyzed polyvinyl acetates, which had substantially the same effectiveness. In the latter case the carbamate side chains are at most attached to only one-fourth of the carbon atoms in the linear vinyl chain. Experiment indicates that hydrophobic low-adhesion polymers can be obtained even when as few as 5% of the carbon atoms of the vinyl chain have attached carbamate side chains. The low-adhesion polyvinyl carbamates are not limited to those containing only acetate groups and hydroxyl groups at the existing possible points of attachment not occupied by carbamate groups. The polyvinyl acetate may be a co-polymer type. Thus we have reacted a hydrolyzed ethylene:vinyl acetate co-polymer with octadecyl isocyanate to obtain a low-adhesion polyvinyl carbamate, which had the advantage of a higher softening point than that obtained with use of straight hydrolyzed polyvinyl acetate. Polyvinyl carbamate molecules containing residual hydroxyl groups, can be chemically cross-linked to increase heat resistance, as by reacting with a small proportion of an appropriate di-isocyanate.

The simple alkyl isocyanates have the general formula:

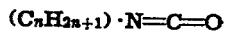

where $n$ should have a value of more than 5 (and preferably at least 14) for making the desired low-adhesion polyvinyl carbamate coating compositions. These monofunctional isocyanates are to be distinguished from the polyfunctional di-isocyanates. The previously mentioned octadecyl isocyanate has the formula:

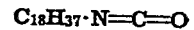

and hence has 18 carbon atoms in the nitrogen-linked alkyl chain. When this is reacted with polyvinyl alcohol (hydrolyzed polyvinyl acetate), the resulting N-octadecyl carbamate side chains have the structure indicated by the formula:

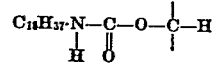

where the carbon atom at the extreme right is one of those in the lengthy vinyl skeleton chain. The nitrogen-linked group need not be a continuous aliphatic hydrocarbon chain, and may include other atoms or radicals capable of being present in the isocyanates, provided that they do not interfere with the desired low-adhesion property of the polyvinyl carbamate product, and permit of a nitrogen-linked side chain which terminates with an alkyl group more than 5 carbon atoms in length.

The low-adhesion coating should be normally solid and should retain a stable low-adhesion characteristic at temperatures substantially above normal room temperature. The greater the side chain length the easier it is to purify the polyvinyl carbamate so as to remove substances of low molecular weight present in the reaction product, and which decrease the effectiveness as low-adhesion coatings.

The low-adhesion coatings of our invention need not consist exclusively of the indicated polyvinyl carbamates. The latter may be blended with another compatible non-tacky high polymer, such as nitrocellulose, for example. Since the low-adhesion effect is produced by the carbamate side chains, the dilution by the blended polymer should not be carried to the point of unduly interfering with the desired low-adhesion action.

A further expedient of practical value is to blend the polyvinyl carbamate with another film-forming non-tacky high polymer in which it has little or no compatibility, by dissolving them in a solvent, such as toluene, so that when the solution is coated on a backing and dried, the polyvinyl carbamate will concentrate at the surface of the dried coating to provide a low-adhesion surface. In this case the polyvinyl carbamate need only constitute a small percentage of the total coating mass, since it is present in higher concentration at the surface where it is effective. This expedient makes possible the use of coating techniques not adapted for directly providing extremely thin coatings of the polyvinyl carbamate.

without increasing the amount of polyvinyl carbamate utilized per unit area. It also has value in connection with coating paper, for example, so that in one coating operation both a surface filling sizing and a low-adhesion backsize are provided (see Fig. 4). This may be termed a two-phase size. Examples of suitable blending polymers for this purpose are ethyl cellulose, polyvinyl acetate and polyvinyl butyral, which permit of the described effect even when as little as 5 or 10% by weight of the polyvinyl carbamate is mixed therewith.

The use of low-molecular weight blending agents is generally undesirable, because of the tendency to blend with or affect the contacting adhesive and to either cause increased interfacial adhesion or to decrease the adhesion of the adhesive to other surfaces to which subsequently applied.

Method of preparing polyvinyl carbamates

A description will now be given of a method of preparing polyvinyl N-octadecyl carbamate which we have found to be very effective. A similar procedure can be used for preparing other polyvinyl carbamates. The product can be made on a comparatively small scale because of the low coating weights which can be employed.

The polyvinyl alcohol is suspended in xylene in a flask provided with a reflux condenser and water trap. The amount of xylene should be about three times the combined weight of polyvinyl alcohol and octadecyl isocyanate to be used. Moisture in the polyvinyl alcohol is removed by refluxing for half an hour. The octadecyl isocyanate is then added in amount equal to about 110% of the theoretical maximum requirement (which depends upon the hydroxyl content of the polyvinyl alcohol). Thus 100 parts by weight of 85% hydrolyzed polyvinyl acetate will need about 550 parts of the octadecyl isocyanate. Refluxing is continued. The progress of the reaction can be judged by the apparent disappearance of the polyvinyl alcohol, which is an insoluble suspension, the reaction product being soluble in the xylene. Two or more hours of refluxing may be employed to insure complete reaction.

The reaction mixture is then allowed to cool below 100° C. and is poured into an equal volume of hot isopropanol (isopropyl alcohol), and the mixture is heated to boiling. A volume of methanol (methyl alcohol), equal to the combined volume of the reaction mixture and isopropanol, is then added to precipitate the polyvinyl N-octadecyl carbamate. The precipitate is removed and is then dispersed in an amount of fresh isopropanol equal to the amount used in the first purification, which is effected by heating to the boiling point and stirring. An equal volume of methanol is again added to precipitate the polyvinyl N-octadecyl carbamate, which is then removed and dried. The purification procedure may be repeated one or more additional times, but this is generally unnecessary. Yields of 90% of the theoretical can be obtained.

This particular procedure insures that substantially all of the hydroxyl groups will be replaced by carbamate groups. Using a sufficiently hydrolyzed polyvinyl acetate as the polyvinyl alcohol, it is not necessary that all hydroxyl groups be replaced in order to have sufficient carbamate side chains to produce low adhesion. But such products are harder to purify and their use may be less effective from a practical standpoint.

Comparative adhesion values

In order to demonstrate the low-adhesion characteristic of polyvinyl carbamate coatings of the character described, the following comparative test data is given. The data was obtained from laboratory tests adapted to determine the relative forces required for unwinding aggressively tacky pressure-sensitive adhesive tapes having the same adhesive but different types of back surfaces. In order to avoid the necessity of actually making a series of such tapes, the expedient was followed of using a standard tape and measuring the force required to remove it from strips of test sheeting under conditions simulating what would occur in unwinding tape from a roll. The standard tape had a cellophane backing and the pressure-sensitive adhesive was compounded of natural rubber (latex crepe) and ester gum in the proportion of 100:85, respectively, by weight. The test strip was either a film of the material to be evaluated, or was a calendered kraft paper sheet coated with the material in sufficient amount to completely cover the fibers and provide a smooth flat surface. These test strips were cut to a size of approximately 1½" x 12". In making a test, a piece of the standard adhesive tape was mechanically rolled in contact with the surface of the test strip to be evaluated, and was allowed to remain in contact for one week. The test strip, bearing the tape on the outside, was then fastened to a substantially frictionless rotatable drum mounted on a tensile testing machine, and the free end of the tape was attached to the carriage. Movement of the carriage caused the adhesive tape to be pulled from the test surface, which simulated the back surface of tape in a roll, and the rate and force required could be determined.

The following table shows the relative removal force required at a constant rate of 10 cm. per minute (0.33 foot per minute), being the ratio of the stripping force required for the test surface relative to the force required to strip such tape from a standard normal cellophane film (14.5% glycerine content) at the same rate. Thus these figures show the relative adhesion values under the angle conditions of tape roll unwinding in tape dispensers, at an unwinding rate which is below the "yield point" of those materials which have such a point.

| Test Surface | Relative Stripping Force Required |
|---|---|
| 1. Ethyl cellulose | 1.5 |
| 2. Polyvinyl alcohol (85% hydrolyzed) | 1.3 |
| 3. Cellulose acetate | 1.2 |
| 4. Shellac (orange) | 1.1 |
| 5. Cellulose acetate stearate | 1.1 |
| 6. Cellophane (non-moistureproofed) | 1.0 |
| 7. Polyvinyl acetate | 0.85 |
| 8. Cellulose tristearate | 0.6 |
| 9. Cellulose tripalmitate | 0.55 |
| 10. Cellulose trilaurate | 0.55 |
| 11. Polyvinyl N-tetradecyl carbamate | 0.4 |
| 12. Polyvinyl N-octadecyl carbamate | 0.4 |

In respect to the polyvinyl N-octadecyl carbamate cited above, the same value was obtained whether made from polyvinyl alcohols of the 85% or 50% hydrolyzed polyvinyl acetate types. The polyvinyl N-tetradecyl carbamate was made from polyvinyl alcohol of the 85% hydrolyzed type.

In another test, the polyvinyl N-octadecyl carbamate coating was found to reach its "yield point" when the stripping force was raised to 10–11 ounces for a one-half inch width adhesive tape of the standard type employed in the above-mentioned tests, at which point the rate of unwind was about 1 foot (30 cm.) per minute. At this unwinding force and rate, the coating lets go of the contacting pressure-sensitive adhesive, so that a higher rate of unwinding can be obtained with no increase in force, and even with a smaller force, permitting of easy high-speed unwinding.

In another series of tests, a large number of adhesive tapes having different rubber-resin type pressure-sensitive adhesive coatings were applied to polyvinyl N-octadecyl carbamate surface coatings and the above-defined relative adhesion values were determined. The rubbery bases used included crude natural rubber, and Buna-S type synthetic rubber (represented by Rubber Reserve Corporation GR–S No. 10). The tackifier resin bases included ester gum, pure hydrocarbon terpene resin of 85° C. melting point ("Piccolyte"), and hydrogenated indene-coumarone resin of 150° C. melting point ("Nevillite resin"). Another tacky adhesive tested was a 75:25 copolymer of 2-ethyl-butyl acrylate and ethyl acrylate. The relative adhesion value did not exceed 0.5 in any such case and was generally considerably lower.

It has been found that polyvinyl carbamates wherein the carbamate side chains terminate with an alkyl group at least 14 carbon atoms in length, have a general effectiveness as low-adhesion backsizes in respect to a great variety of pressure-sensitive tape adhesives, including those which contain relatively large proportions of tackifier resins. However, those having shorter alkyl groups can be used satisfactorily in connection with various particular adhesives. Synthetic polymer adhesives which do not contain tackifier resin permit the use of polyvinyl carbamates having relatively short length alkyl groups, presumably because of the absence of such resin which otherwise would tend to migrate into the contacting polyvinyl carbamate backsize coating. An example of such an adhesive is a 75:25 copolymer of 2-ethyl-butyl acrylate and ethyl acrylate, in respect to which it has been found that the alkyl groups are sufficiently long if they are more than five carbon atoms in length.

In our experiments we have made and tested each of the following polyvinyl carbamates to provide data for the foregoing conclusions respecting the lengths of the alkyl side chains, namely, the amyl, heptyl, octyl, decyl, dodecyl, tetradecyl and octadecyl carbamates.

Having described various embodiments of our invention, for purposes of illustration rather than limitation, what we claim is as follows:

1. In combination with an article having an adherent rubber surface, a removable liner having a low-adhesion surface coating in removable contact with said adherent rubber surface, said low-adhesion surface coating being formed of a hydrophobic polyvinyl carbamate having nitrogen-bonded hydrocarbon side chains which provide terminal alkyl groups more than 5 carbon atoms in length.

2. In combination with an article having an adherent rubber surface, a removable liner having a low-adhesion surface coating in removable contact with said adherent rubber surface, said low-adhesion surface coating being formed of a hydrophobic polyvinyl carbamate having nitrogen-bonded hydrocarbon side chains which provide terminal alkyl groups at least 14 carbon atoms in length.

3. In combination with a pressure-sensitive adhesive coating, a removable liner having a low-adhesion surface coating in removable contact with said adhesive coating, said low-adhesion surface coating being formed of a hydrophobic polyvinyl carbamate having nitrogen-linked hydrocarbon side chains which provide terminal alkyl groups more than 5 carbon atoms in length.

4. In a roll of pressure-sensitive adhesive tape which is normally tacky on both sides, an interwound liner filmed on both sides with a low-adhesion coating of a hydrophobic polyvinyl carbamate having nitrogen-linked hydrocarbon side chains which provide terminal alkyl groups more than 5 carbon atoms in length.

5. A normally tacky and pressure-sensitive adhesive tape characterized by having a low-adhesion backsize formed of a hydrophobic polyvinyl carbamate having nitrogen-linked hydrocarbon side chains which provide terminal alkyl groups more than 5 carbon atoms in length.

6. A normally tacky and pressure-sensitive adhesive tape characterized by having a low-adhesion backsize formed of a hydrophobic polyvinyl carbamate having nitrogen-linked hydrocarbon side chains which provide terminal alkyl groups at least 14 carbon atoms in length.

7. A normally tacky and pressure-sensitive adhesive tape wound upon itself in roll form and characterized by having a non-fibrous film backing coated on the inner face with a normally tacky water-insoluble rubbery base eucohesive pressure-sensitive adhesive and backsized with a low-adhesion coating formed of a hydrophobic polyvinyl N-alkyl carbamate having nitrogen-linked alkyl terminal chains which are more than 5 carbon atoms in length, the tacky adhesive being inactive to the back surface of the tape to a degree permitting easy unwinding of the tape without delamination or breaking and without offsetting of adhesive.

8. A normally tacky and pressure-sensitive adhesive tape wound upon itself in roll form and comprising a transparent non-fibrous cellulosic film backing, a coextensive normally tacky water-insoluble rubbery base eucohesive pressure-sensitive adhesive coating firmly united to the inner face of the backing film, and a coextensive transparent low-adhesion backsize firmly united to the outer face of the backing film and formed of a hydrophobic polyvinyl N-alkyl carmabate having nitrogen-linked alkyl terminal chains which are at least 14 carbon atoms in length, the tacky adhesive being inactive to the low-adhesion backsize to a degree permitting easy unwinding of the tape without delamination or breaking and without offsetting of adhesive.

9. A normally tacky and pressure-sensitive adhesive tape wound upon itself in roll form and characterized by having a paper backing coated on the inner face with a normally tacky water-insoluble rubbery base eucohesive pressure-sensitive adhesive and backsized with a low-adhesion coating formed of a hydrophobic polyvinyl N-alkyl carbamate having nitrogen-linked alkyl terminal chains which are more than 5 carbon atoms in length, the tacky adhesive being inactive to the back surface of the tape to a degree permitting easy unwinding of the tape without delamination or breaking and without offsetting of adhesive.

10. A normally tacky and pressure-sensitive adhesive tape wound upon itself in roll form and characterized by having a paper backing coated on the inner face with a normally tacky water-insoluble rubbery base eucohesive pressure-sensitive adhesive and backsized with a low-adhesion hydrophobic coating formed of a hydrophobic polyvinyl N-alkyl carbamate having nitrogen-linked alkyl terminal chains which are at least 14 carbon atoms in length, the tacky adhesive being inactive to the back surface of the tape to a degree permitting easy unwinding of the tape without delamination or breaking and without offsetting of adhesive.

CARL A. DAHLQUIST.
JAMES O. HENDRICKS.
WILLIAM E. SOHL.

REFERENCES CITED

The following references are of record in the file of this patent:

UNITED STATES PATENTS

| Number | Name | Date |
| --- | --- | --- |
| 2,206,046 | Pollard | July 2, 1940 |
| 2,284,896 | Hanford et al. | June 2, 1942 |
| 2,370,405 | Kaase et al. | Feb. 27, 1945 |
| 2,374,136 | Rothrock | Apr. 17, 1945 |
| 2,386,141 | Rogers et al. | Oct. 2, 1945 |
| 2,395,668 | Kellgren | Feb. 26, 1946 |
| 2,466,404 | Fowler et al. | Apr. 5, 1949 |